W. P. PARROTT.
Steam Pressure Gage.

No. 29,307.

Patented July 24, 1860.

Witnesses

Inventor

UNITED STATES PATENT OFFICE.

WM. P. PARROTT, OF BOSTON, MASSACHUSETTS.

STEAM-PRESSURE GAGE.

Specification of Letters Patent No. 29,307, dated July 24, 1860.

*To all whom it may concern:*

Be it known that I, WILLIAM P. PARROTT, civil engineer, of Boston, in the county of Suffolk and State of Massachusetts, have invented a new and useful Improvement in Steam-Pressure Gages; and I do hereby declare that the same is fully described and represented in the following specification and the accompanying drawings.

My invention or improvement has reference to a steam pressure gage, the movements of whose indicator are produced by those of a compound bar composed of two metals having unequal expansive ratios, such bar when exposed to any variation of temperature being caused to bend, expand or contract or otherwise operate in a manner so as to effect a movement of the indicator.

The nature of my invention consists in a combination of an insulation case or chamber with such compound bar and the space, chamber or device for generating or containing the steam to whose temperature or variations thereof the compound bar is to be exposed in order to determine the degree of pressure of such steam, the object of such insulation chamber being to protect the compound bar from contact with and corrosion by the steam as well as from having saline, earthy or other deposits made on it whereby its efficiency or correct action might be impaired.

Figure 1:
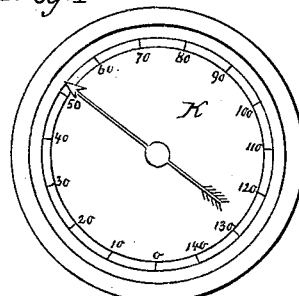

Figure 1, of the above mentioned drawings, represents an elevation of the instrument as fixed in the shell of the boiler *s, s* by the screw S, A, being the dial box; K, the dial plate; E, the index; F, the axle attached to the combination R, of metallic rods or plates.

Figure 2:
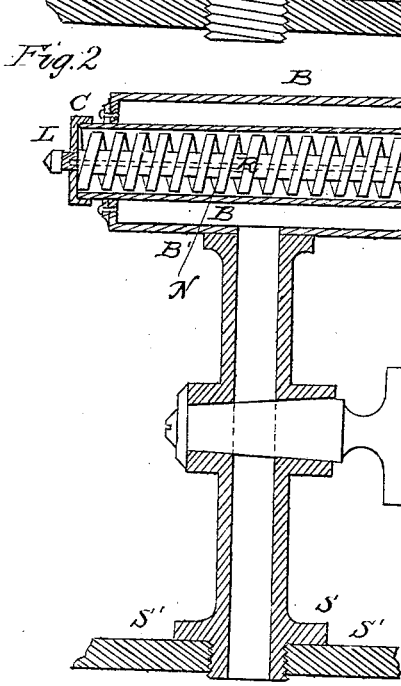

Fig. 2, denotes a longitudinal section of the same, and shows the connecting pipe and stop cock, the said pipe being inserted into the boiler and attached to the case B', which contains within it the tube or insulator B, in which the combined metallic rods or plates R, are placed.

Figure 5:
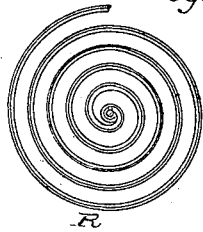
Figure 6:
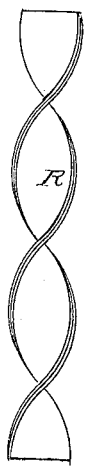

In the figures the rods or bars are exhibited as bent in the form of a helix, one of the plates being of iron and the other of copper. They may be firmly fastened together, side by side, by brazing or the copper may be deposited upon the iron by the galvanic process, the whole being of sufficient length to give the required expansion to measure the degrees of heat required. The helix is fastened at one end to a cap C, the other to a movable arm D, arranged on the internal rod N, and movable around it. Into the arm D, is inserted and fastened the axle F, which carries the index E. A represents the dial box; K, the dial plate; E, the index; *g g*, the glass covering of the dial. Instead of being in the form of a helix the compound bar composed of metallic plates of different expansive ratios, may be put into that of a volute as shown in Fig. 5, and this when a great range of motion may be required. When a small range of motion may be wanted it may have the twisted form shown in Fig. 6.

The steam being admitted into the casing B', and in contact with the insulator B, its temperature will be communicated to the metallic helix within the latter. By the unequal expansion of the metals of the helix a rotary motion on the shaft N, will be imparted to the arm so as to cause it to move the axle F, and the index pointer E, so as to exhibit upon the dial plate K, the pressure due to the temperature of the steam within the case B', and in contact with the insulator B, containing the expansive coil. When the steam is on, the cap C, may be easily removed either for the removal or adjustment of the coil.

In order to prevent radiation of the heat the tube or casing B', may be surrounded by a non-conducting substance which if required may also be placed between the end of the tube and the dial plate.

Figure 3:
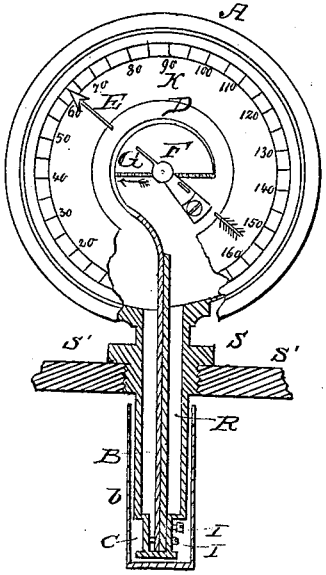

Fig. 3, represents a modification of my invention or the adaptation of the insulator case to a straight compound bar of metals having different expansive ratios. This figure shows a longitudinal section of a pressure gage. A represents the dial box; E, the index; F, the axle; G, a chain for communicating rotary motion to such axle; B, the insulator containing the compound bar, R, and fixed by a screw S into the boiler S'; C, is the cap; I, a screw holding the plates in the cap C. An adjusting spring D, connects the compound rod R, with the chain G, and the axle F. K denotes the dial plate.

Figure 4:
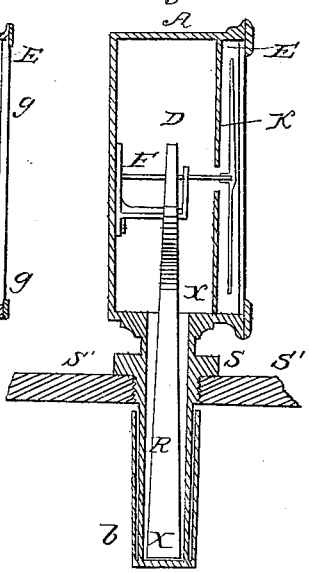

Fig. 4, represents a transverse section of the gage shown in Fig. 3.

The bar R, composed of two metals—copper and iron—has its lower end fixed firmly by the screw I, into the bottom of the insulator B. The free end of the part R, is fastened to the spring D, bent in the form and carrying a chain G, as shown in Fig. 3. This chain is wound around the axle or shaft F, which is arranged in the dial box, as shown in the drawings, and carries the index E, which serves to indicate upon the dial plate K, the motion imparted to the rod R, by the heat of the steam.

As the pressure of the steam may increase within the boiler its temperature will rise and heat the case B, in a corresponding degree. This will cause the bar R, to bend more or less, the motion of the rod or bar being communicated through the spring D, and chain G, to the axle F.

The movement of the part R, causes the chain to unwind on one side of the axle F, and wind up on the other side of it and so as to communicate the motion of the part R, to the index E, and to indicate upon the dial plate the degree of pressure of the steam due to the temperature affecting the said part R.

Having thus described my invention, and its mode of operation, what I claim is as follows:

The combination of the insulation case or chamber B, with the compound bar R, and the space chamber or device for generating or holding the steam, the whole being arranged substantially in manner and to operate as described.

WM. P. PARROTT.

Witnesses:
R. H. EDDY,
F. P. HALE, Jr.